No. 748,156. PATENTED DEC. 29, 1903.
F. BEMENT.
INTERLOCKING MECHANISM.
APPLICATION FILED JUNE 30, 1903.
NO MODEL.
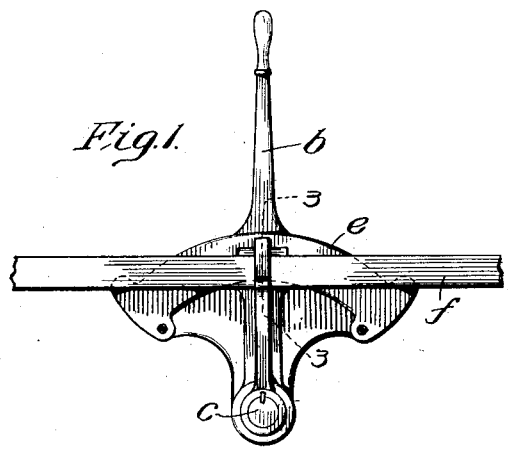
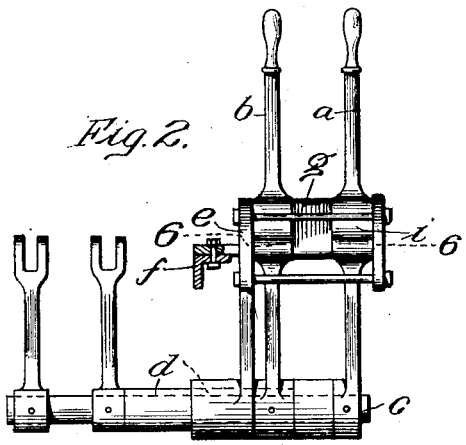
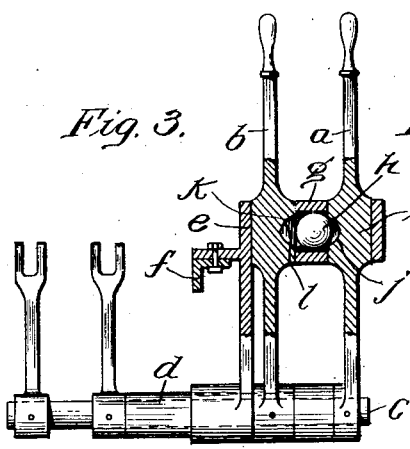
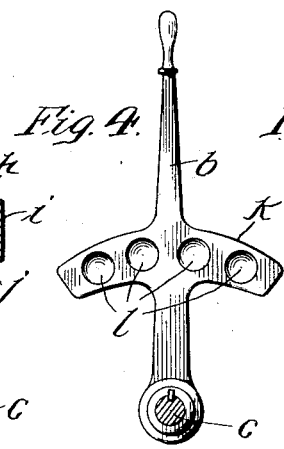
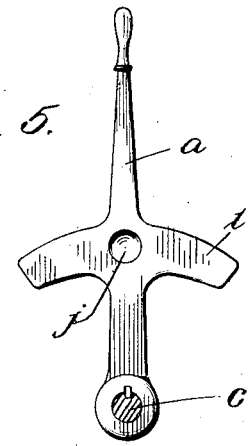
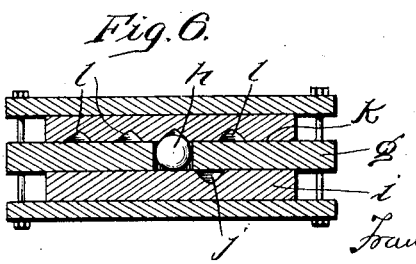
WITNESSES:
F. J. Hartman
INVENTOR
Frank Bement
BY
Chas. A. Cutter
ATTORNEY.

No. 748,156. Patented December 29, 1903.

UNITED STATES PATENT OFFICE.

FRANK BEMENT, OF TOMS RIVER, NEW JERSEY.

INTERLOCKING MECHANISM.

SPECIFICATION forming part of Letters Patent No. 748,156, dated December 29, 1903.

Application filed June 30, 1903. Serial No. 163,718. (No model.)

*To all whom it may concern:*

Be it known that I, FRANK BEMENT, a citizen of the United States, and a resident of Toms River, Ocean county, New Jersey, have invented certain new and useful Improvements in Interlocking Mechanism, of which the following is a specification.

My invention relates to improvements in interlocking devices; and the object of my invention is to furnish a simple, inexpensive, and positive means for interlocking the means—two levers, for instance—which control two or more different movements—for instance, one a clutch and the other a train of change-gears—so that it will be impossible to operate either part or movement unless the several mechanisms are first all brought to a point from which any one can be operated without danger to itself or to any of the others.

My invention is particularly adapted for interlocking the two levers which control the one the change-gear mechanism and the other the clutch coupling the change-gears of an automobile to the driving mechanism; but it will be understood that I do not desire to confine myself to this use of my invention, for it may be applied to any other machine or machines where a substantially similar action is required.

In the accompanying drawings, forming part of this specification, and in which similar letters of reference indicate similar parts throughout the several views, Figure 1 is an end elevation of an interlocking device of my construction; Fig. 2, a side elevation of Fig. 1; Fig. 3, a section of Fig. 1 on line 3 3; Fig. 4, an elevation of the inside of a change-gear-operating lever, showing depressions in segment; Fig. 5, a similar view of a clutch-operating lever; Fig. 6, a section of Fig. 2 on line 6 6.

In the drawings my invention is shown applied to the clutch and change-gear operating mechanism of an automobile.

$a$ is the lever operating the clutch.

$b$ is the lever operating the change-gears.

The clutch and change-gears being well known are not shown, it being deemed sufficient to show the levers and the interlocking device, which fully explain the invention.

In the construction shown the lever $a$ is fast at its lower end to a shaft $c$ and the lever $b$ to a shaft $d$, which is hollow and through which the shaft $c$ passes. The shaft $d$ is carried in a bearing $e$, which is carried by a frame $f$.

$g$ is a stationary block placed between the levers $a$ $b$ and carrying in a suitable pocket a stop $h$, preferably a ball, the diameter of which is somewhat greater than the width of the block $g$.

The clutch-operating lever $a$ has but two positions—one, we will say, forward when the clutch is in gear, the other backward or vertical when the clutch is out of gear. The side of this lever facing the block $g$ is wide or carries a sector $i$, which is furnished with a depression $j$ sufficiently deep to receive that part of the stop $h$ which projects past one side of the block $g$ when its other side is flush with the other side of the block.

The change-gear-operating lever $b$ operates mechanism that has, we will assume, three movements forward and one movement backward, and this lever upon its side facing block $g$ is wide or carries a sector $k$, which is furnished with as many depressions $l$ as there are operations performed by different positions of this lever, in the present case four. These depressions are similar to the one in the lever $a$. If the lever $a$ is so placed that the depression $j$ in it is opposite the stop $h$, the lever $b$ can be moved back or forth at will, because the projecting part of the stop can enter depression $j$, leaving the lever $b$ free to move; but the lever $a$ cannot be moved until lever $b$ is moved so as to bring one of its depressions $l$ opposite the stop. As soon as the desired depression $l$ is brought opposite stop $h$ lever $a$ can be moved so as to throw the clutch into operation; but as soon as lever $a$ is moved the depression $j$ in it is moved away from the stop, which now engages the depression $l$ in the lever $b$ which is opposite the stop, the stop being moved into the depression $l$ and held there by the flat face of the lever $a$, effectually locking the lever $b$ until the lever $a$ is again moved so as to bring its depression $j$ opposite the stop. In other words, the stop serves to prevent any movement of the lever $b$ while the clutch or other mechanism controlled by lever $a$ is in gear and also prevents any movement of the lever $b$ during movements of the lever $a$.

Having thus described my invention, I claim as new and desire to secure by Letters Patent—

1. In an interlocking device, in combination, two movable members furnished upon adjacent faces, the one with a single depression, and the other with two or more depressions, a stationary member placed between said movable members and furnished with a pocket passing from one of its sides to the other, and a movable stop within said pocket, the diameter or length of said stop being somewhat greater than the width of the stationary member.

2. In an interlocking device, in combination, two levers, the inner faces of which carry one a single depression and the other two or more depressions, a stationary sector between said levers furnished with a pocket open at its ends, and a ball within said pocket, the diameter of which is greater than the length of said pocket.

3. In an interlocking device, in combination, levers pivoted upon a common axis and carrying sectors furnished upon adjacent sides, the one with one depression, the other with two or more depressions, a fixed sector placed between the sectors on said levers, and a movable stop carried by said fixed sector adapted to alternately engage the depressions in the movable sectors upon the opposite sides thereof.

4. In an interlocking device, in combination, two levers, the one adapted to operate a clutch and the other to operate a change-gear mechanism, a stationary block placed between said levers, and a movable stop carried by said block and operated by said levers to prevent any movement of the change-gear-operating lever until the clutch-operating lever is moved so as to throw the clutch out of gear.

FRANK BEMENT.

Witnesses:
JOSEPH ALSHEIMER,
GEORGE C. LOW.